(12) United States Patent
Hager et al.

(10) Patent No.: US 12,552,555 B1
(45) Date of Patent: Feb. 17, 2026

(54) MITIGATING EFFECTS OF ATOMIC OXYGEN

(71) Applicant: Eagle Technology, LLC, Melbourne, FL (US)

(72) Inventors: Mark Alan Hager, West Henrietta, NY (US); Jacob Nichols, Honeoye Falls, NY (US); Melody Renee Hawkins, Irondequoit, NY (US); Aaron Gabriel Salce, Ontario, NY (US)

(73) Assignee: Eagle Technology, LLC, Melbourne, FL (US)

( * ) Notice: Subject to any disclaimer, the term of this patent is extended or adjusted under 35 U.S.C. 154(b) by 349 days.

(21) Appl. No.: 18/363,401

(22) Filed: Aug. 1, 2023

(51) Int. Cl.
*B64G 1/52* (2006.01)
*G02B 23/02* (2006.01)

(52) U.S. Cl.
CPC .............. *B64G 1/52* (2013.01); *G02B 23/02* (2013.01)

(58) Field of Classification Search
CPC ....................................................... B64G 1/52
See application file for complete search history.

(56) References Cited

U.S. PATENT DOCUMENTS

| | | | |
|---|---|---|---|
| 5,077,106 A * | 12/1991 | Dursch | B29C 66/7394 138/140 |
| 7,240,879 B1 | 7/2007 | Cepollina et al. | |
| 8,048,938 B2 | 11/2011 | Poe et al. | |
| 2006/0057407 A1 * | 3/2006 | Sambasivan | C08J 7/048 428/472.3 |
| 2014/0329172 A1 | 11/2014 | Hart et al. | |
| 2015/0146288 A1 * | 5/2015 | Newswander | G02B 23/06 359/399 |
| 2020/0207061 A1 | 7/2020 | Minton et al. | |
| 2020/0400935 A1 * | 12/2020 | Shen | G02B 7/022 |

FOREIGN PATENT DOCUMENTS

| | | |
|---|---|---|
| CN | 1865350 A | 11/2006 |
| CN | 105776125 A | 7/2016 |
| CN | 105835498 A | 8/2016 |
| CN | 107201034 A | 9/2017 |
| WO | 2023/091481 A1 | 5/2023 |

* cited by examiner

*Primary Examiner* — Edmond C Lau
(74) *Attorney, Agent, or Firm* — Edell, Shapiro & Finnan, LLC

(57) ABSTRACT

Mitigation of erosive effects of atomic oxygen encountered by telescope systems deployed in low earth orbit (LEO is effected by providing an array of multiple very small projections on the interior surface of an open-ended tubular metering shell extending forwardly from a mirror to be protected. The projections are made of material that is geometrically configured to deflect AO atoms one or more times within the shell at angles that ultimately direct the atoms away from the mirror surface and back out through the forward end of the shell.

12 Claims, 4 Drawing Sheets

MITIGATING EFFECTS OF ATOMIC OXYGEN

TECHNICAL FIELD

The present disclosure pertains generally to mitigating the erosive effects of atomic oxygen encountered by spacecraft systems deployed in low earth orbit (LEO), and more particularly to systems and methods for mitigating damage to the surfaces of mirrors, lenses and other components in telescopes deployed in LEO.

BACKGROUND

Atomic oxygen (AO) is a significant atmospheric component in LEO up to altitudes of approximately 450 miles and is known to be extremely harmful to oxygen-reactive materials, i.e., materials that can readily be oxidized, such as polymers, carbon and some metals. For purposes of the present disclosure, it is to be specifically noted that AO degrades silvered optical coatings and erodes Kapton which is a polyimide film used on spacecraft. AO is an intrinsically reactive free radical, a characteristic which combines with the high relative velocity between the orbiting spacecraft material and the relatively dense LEO distribution of AO to enhance the ability of oxygen to react with that material. The degree of AO-caused degradation is determined by several factors, some of which are: spacecraft altitude (i.e., AO density decreases with altitude in LEO); and spacecraft attitude or optical surface orientation relative to direction of travel (i.e., surfaces facing the direction of travel have the greatest exposure to the surrounding AO whereas surfaces facing parallel or opposite to the direction of travel have reduced exposure).

The above-described degradation issues caused by the impact of AO in LEO has been well documented, and there have been several attempts to mitigate the problem, typically chemically by applying protective AO-resistant coatings to exposed sensitive surfaces or using carbon nanostructures to absorb the AO. However, these expedients can be difficult to apply, and present issues with long term adherence in the environments in which they are used. In addition, coatings can contaminate the optical properties of surfaces and are subject to degradation due to space radiation over time.

The system and method described herein address the AO-caused degradation issue in a different manner, namely by minimizing the amount of AO that can reach the surfaces to be protected.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Broadly stated, the principles disclosed herein mitigate AO-caused effects by physical means without the need for optical surface coatings or exotic techniques such as carbon nanostructures. The disclosed principles rely on the fact that AO deflects from (i.e., bounces off) surfaces in a determinable manner that is, at least partially, dependent on the surface material. With that in mind, in one aspect of this disclosure, multiple small geometrically designed projections are provided on the interior surface of a tubular metering shell that extends forwardly from an optical surface to be protected, e.g., from the reflective surface of a primary mirror in a telescope. The geometric projections are made of material having known AO deflection properties such that the AO atoms deflect one or more times at angles that ultimately direct the atoms away from the mirror surface and back out through the forward end of the shell. In one embodiment the geometric projections are annular ridges, each having a generally triangular cross-section tapering from the interior wall toward the optical axis (i.e., the central longitudinal axis of the metering shell). Multiple such ridges may be provided in an array in which successive ridges are axially spaced from one another along all or a portion of the length of the interior surface of the shell. The angles subtended by the forward-facing surfaces of the ridges are chosen to optimize the deflection of the incoming AO atoms for a given axial orientation of the shell relative to the direction of travel of the telescope through the AO environment.

In another aspect the ridges are defined on the interior surface of the shell by means of a mandrel having the series of ridges machined on its outer surface. An epoxy having known AO deflection properties is applied to the mandrel prior to the shell forming process and conforms to the ridges on the mandrel. The epoxy material with the ridges formed therein is then transferred from the mandrel to the interior surface of the shell and allowed to permanently harden with the result that the ridges are imprinted on the shell interior surface.

BRIEF DESCRIPTION OF THE DRAWINGS

By way of example, specific illustrative embodiments of the present disclosure will now be described with reference to the accompanying drawings.

DETAILED DESCRIPTION OF EXAMPLE EMBODIMENTS

Figure 1:
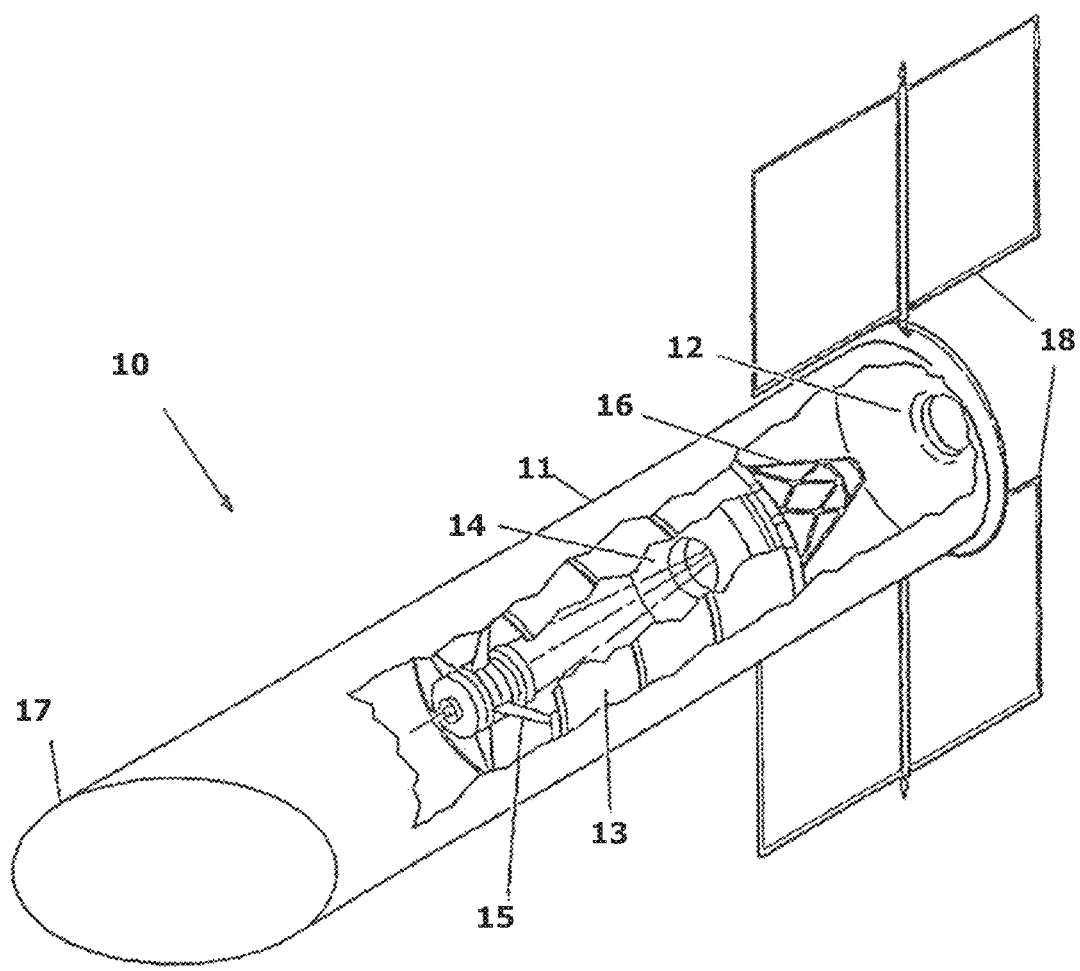
FIG. 1 is a diagrammatic, partially broken-away perspective view of a prior art telescope of the type to which the principles disclosed herein apply.

The present systems and methods are described more fully hereinafter with reference to the accompanying drawings, in which several exemplary embodiments are shown. It will be readily understood that the components of the embodiments as generally described herein and illustrated in the appended drawings may be arranged and designed in a wide variety of different configurations. Thus, the following more detailed description of various embodiments, as represented in the drawings, is not intended to limit the scope of the present disclosure but is merely representative of various embodiments. While the various aspects of the embodiments are presented in the drawings, the drawings are not drawn to scale unless specifically indicated.

The subject matter disclosed herein may be embodied in other specific forms without departing from its spirit or essential characteristics; that is, the described embodiments are to be considered in all respects only as illustrative and not restrictive. The scope of the invention(s) is/are, therefore, indicated by the appended claims rather than by this detailed description. All changes that come within the meaning and range of equivalency of the claims are to be embraced within their scope.

Reference throughout this specification to features, advantages, or similar language does not imply that all the features and advantages that may be realized with the disclosed apparatus, system and method should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the disclosed systems may be combined in any suitable manner in one or more embodiments. One skilled in the relevant art will recognize, in light of the description herein, that the embodiments can be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

For purposes of the disclosure and claims herein, the following terms shall have the indicated meanings:
 a. The terms "axial", "axially", etc., mean the direction parallel to the optical axis of the telescope and its metering shell described herein.
 b. The terms "radial", "radially", etc., refer to the direction perpendicular to the optical axis of the telescope and metering shell.
 c. The terminology "attitude angle" means the angle between the velocity vector and the optical axis of the telescope.

Referring specifically to FIG. 1, which is provided herein primarily for contextual purposes, there is illustrated a prior art telescope 10 of the type to which the principles disclosed herein may apply. Other such telescopes to which the present principles may apply are described and illustrated in U.S. Pat. No. 7,240,879 (Cepollina et al.), the entire disclosure in which is incorporated herein by reference. Telescope 10 is designed for low earth orbit (LEO) deployment and includes a tubular protective shield 11 serving to protect the interior telescope components from multiple aspects of the space environment. A light shade 17 extends from the forward end of shield 11, and a support systems module 12 is located at the rearward end of shield. Inside the shield is a metering shell 13 extending forwardly from a primary mirror 14. A secondary mirror assembly 15 is located in shell 13 forward of the primary mirror. The optical axes of mirrors 14 and 15 are typically coaxially aligned. A science instrument package 16 is disposed behind the primary mirror. Solar arrays 18 are provided to supply power to the instrumentation. Metering shell 13 typically has a cylindrical interior wall disposed coaxially about the optical axes or mirrors 14 and 15 and maintains the optical alignment of the secondary mirror relative to the primary mirror.

In a typical operation light enters the forward end of the metering shell, is collected by the primary mirror 12, and reflected toward the smaller secondary mirror 15. The secondary mirror bounces the light back toward the primary mirror and through a small aperture (not shown) at the center of the primary mirror from which the light is focused on a focal plane where it is detected by the various science instruments 16.

Figure 2:
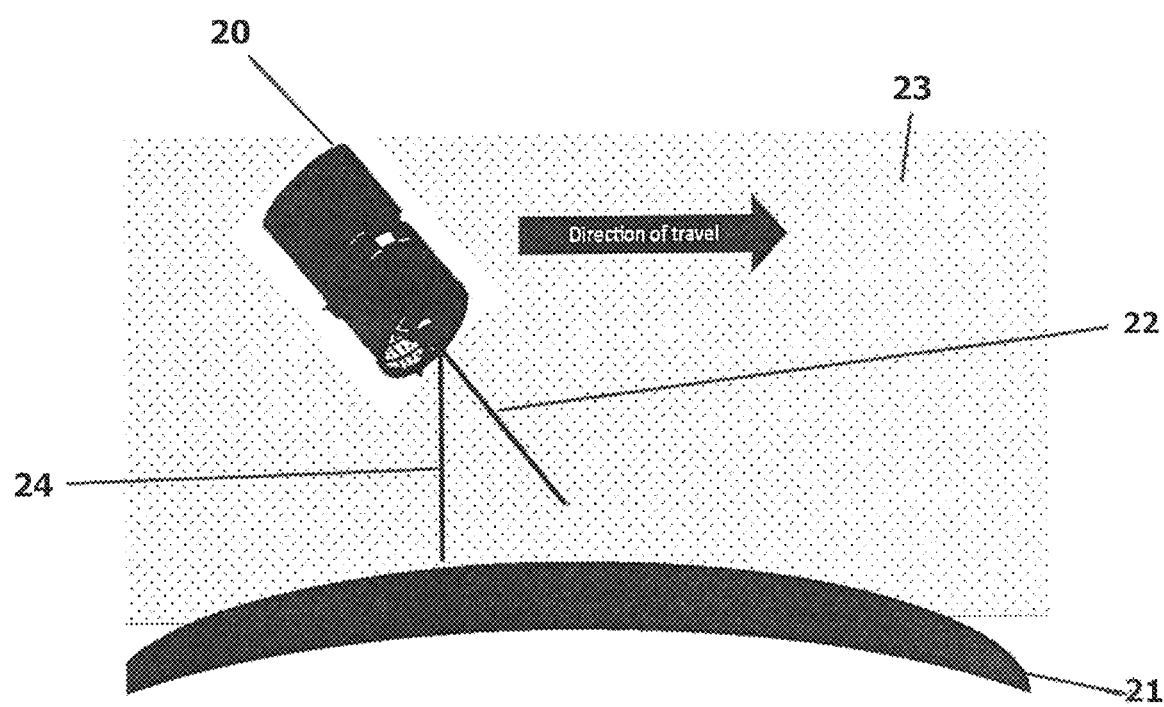
FIG. 2 is a diagrammatic illustration of a telescope orbiting the earth in a high-density atomic oxygen environment.

Referring to FIG. 2, a telescope 20 of one of the types described above is shown orbiting the earth 21 in a low earth orbit replete with atomic oxygen (AO) atoms 23. The direction of orbital travel, or velocity vector, is designated by the direction of travel arrow 25. The height or vertical direction to earth 21 of the telescope 20 is designated by line 24 which is perpendicular to velocity vector 25. For the mission position illustrated in FIG. 2, the optical axis 22 of the telescope is at a defined attitude angle relative to velocity vector 25. It will be appreciated that AO atoms enter the open forward end of the telescope at a flow rate determined by the velocity of the telescope as it travels through the AO environment 23, and that the path directions of the entering AO atoms are determined by the attitude angle of the telescope. That is, as the attitude angle decreases, most of the entering AO atoms follow paths that become closer to parallel to the optical axis. On the other hand, as the attitude angle approaches 90°, less and less AO enters the telescope. The purpose of the present disclosure is to mitigate the potential for damage to the primary mirror and other optical components of the telescope caused by those AO atoms entering telescope and, as will be appreciated from the descriptions below, is most effective for situations wherein the attitude angle is substantially greater than 0° and substantially less than 90°.

Figure 3:
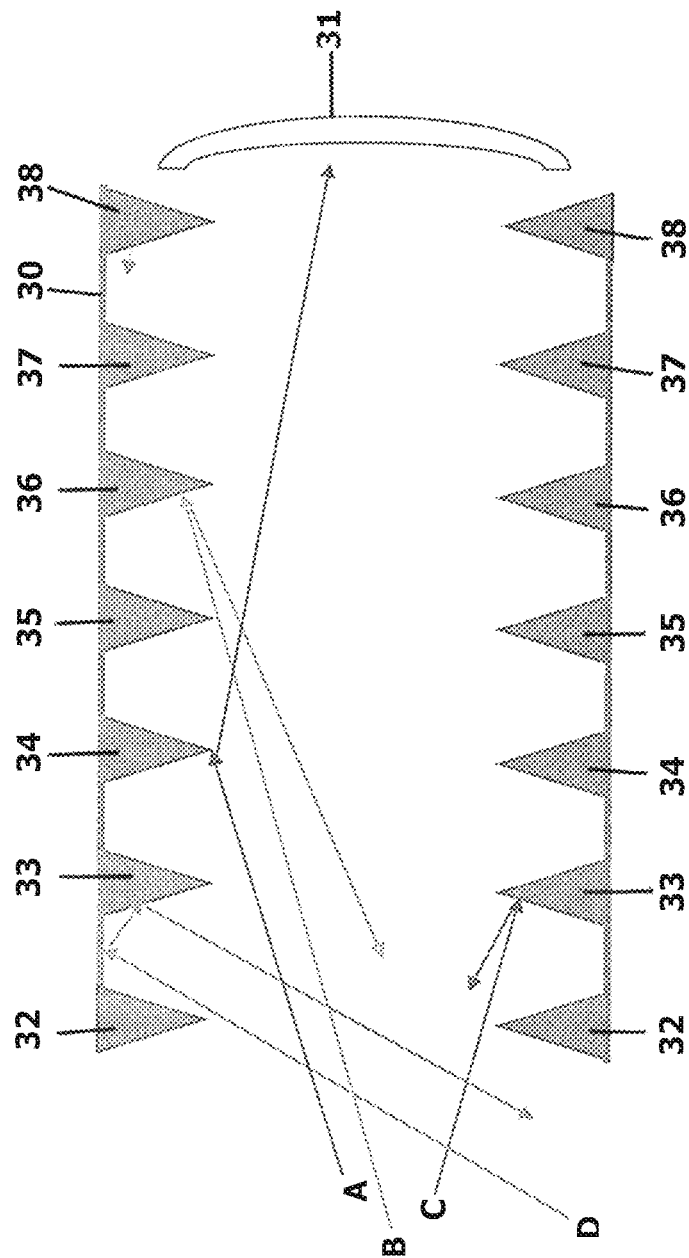
FIG. 3 is a schematic illustration of a forward metering shell and primary mirror of a telescope in which the principles disclosed herein are applied.

FIG. 3 is a schematic illustration showing a metering shell 30 disposed forwardly of a primary mirror 31 in a telescope (e.g., any of the types of telescopes refenced above) modified to embody the principles of the present disclosure. For purposes of clarity and understanding, the secondary mirror of the telescope is not shown in the schematic illustration of FIG. 3. The interior surface of the forward metering shell 30 is generally cylindrical and is concentrically disposed about the optical axis of primary mirror 31. Imprinted on the interior surface of the shell is a series of spaced projections which, in the illustrated embodiment, are axially spaced ridges 32, 33, 34, 35, 36, 37, 38 of generally triangular axial cross-section projecting and tapering radially inward, i.e., toward the optical axis of mirror 31. It will be understood that the diameter of shell 30 is several orders of magnitude larger than the radial length of the ridges and that, for purposes of clarity and understanding, the ridges 32-38 are schematically shown much larger relative to shell 30 and mirror 31 than would be the case in an actual device or system. For example, the radial height dimension of the ridges, and the axial width at the base of the ridges, would typically be on the order of 0.0075 inch which cannot be clearly shown in true perspective relative to a metering shell several feet in diameter. In addition, the number of such ridges would typically be much greater than the seven ridges shown.

The angles of the ridges and the axial distances between them are designed to facilitate predetermination of directions of the elastic deflections therefrom by AO atoms. Specifically, during a mission in low earth orbit AO atoms enter the forward end of the shell, and the ridges are configured and positioned to deflect as many as possible of those AO atoms one or more times as necessary to eject the atoms out from the forward end of the shell. The directions of those deflections depend on the angles of the forward-facing surfaces of ridges 32-38 as well as the paths of the atoms upon entering the shell. For example, the path of atom B in FIG. 3 shows it deflecting from (i.e., bouncing off) the forward-facing surface of ridge 36 directly back toward the open forward end and out of the shell. Likewise, the path of atom C shows that atom deflecting off the forward-facing surface of ridge 33 directly back toward the open forward end and out of the shell. The path of atom D shows it initially deflecting off the interior surface of shell 30 in the gap between ridges 32 and 33, and then off the forward-facing surface of ridge 33 which deflects atom D back toward the open end and out of the shell.

Depending on the angle of an atom's path relative to the optical axis of the shell, not every AO atom will be deflected back out of the shell. For example, the path of atom A in FIG. 3 shows it skimming off the tip of ridge 34 and then travelling toward mirror 31. In other words, the ridges will not necessarily prevent every AO atom that enters the shell form reaching the mirror. However, by selecting (a) the number and spacings of the ridges and (b) the angles made by their forward-facing surfaces relative to the optical axis of the shell, the percentage of entering atoms deflected out of the shell can be maximized for an intended attitude angle during orbit. As noted above in relation to FIG. 2, the range of attitude angles to be experienced is determined for each mission, thereby enabling the ridge positions and angles to be designed for optimum AO damage mitigation for that mission.

Orbit tests of AO scattering have shown AO to consistently scatter at 45° from a surface normal to the angle of incidence, but to vary when AO impacts a non-normal surface. Because the angle of incidence on the surface will vary due to the attitude angle requirements of a mission, the ridges cannot simply be designed to face 90° to the incoming AO and then mutually spaced accordingly. Thus, the forward-facing surfaces of the ridges are configured to eject as much AO as possible with a varying angle of incidence and angle of scatter. Due to the width of the open forward end of the shield, AO will bounce at most once on a gap segment before striking the primary mirror. Therefore, the ridges must be spaced far enough so that an AO atom that strikes the bottom part of a ridge, near a gap region on the shield surface, will be ejected away from the mirror, and the ridges must also be spaced such that the scattered AO will not hit the side of the next ridge.

For AO that strikes the interior shield surface in a gap region between the ridges, all AO that scatters at greater than 45° will strike the next ridge and be ejected by its second deflection away from the primary mirror and out of the metering shield.

In a typical embodiment the gap regions along the shell interior surface occupy roughly 66% of the shell interior wall and the (relevant) angled portion of the ridges occupy roughly 16%.

Regarding the angle of the forward-facing surfaces of the ridges relative to the optical axis, that angle may vary from ridge to ridge and would preferably be in the range of approximately 50° to 75°, depending again on maximum attitude angle between the optical axis and the velocity vector direction. In missions where the attitude angle is expected to vary, the time during which that angle is at maximum will be a factor in choosing the surface angle. The goal is to avoid the impact angle between the AO atoms and the forward-facing surfaces of the ridges from being near 90° in order to control the direction toward which most of the AO will deflect or bounce. Preferably, the angle between the forward-facing surface of the ridge and the trajectory of the AO atom should be approximately 45°.

The annularly continuous ridges illustrated and described above are not the only structural features that may be used to effect AO mitigation according to the principles described herein. For example, each ridge described above may instead be segmented into multiple annularly spaced arcuate ridge sections. The ridge sections need not be of equal annular length and the annular spacings between such ridge sections need not be equal. The spacings in each segmented ridge would typically not be aligned with the spacings of the axially preceding and succeeding segmented ridges. In other words, the annular segments and spacings in successive ridges would typically be offset to assure that AO that enters the shell impacts some ridge segment(s) at some point along its path. Moreover, the sections within any segmented ridge, and the sections from ridge to ridge, may have different configurations and deflective surfaces that are predetermined as appropriate to achieve the overall desired AO atom deflection requirements for any particular mission.

The axial lengths of the gap segments between successive axially spaced ridges, whether or not the ridges are segmented, may be a design tradeoff. Entering AO atoms that impact near the base of the forward-facing surface require enough distance to gain sufficient height, after deflection, to not impact the adjacent ridge which would deflect it back toward the primary mirror. However, an AO atom impacting a gap segment between ridges must not find enough space to enable it to entirely miss the next ridge and hit the primary mirror. Having ridge spacing approximately twice the size of the radial length of the ridge would be a reasonable design parameter for many missions since the AO will effectively experience only one deflection within the shell and then will either be ejected or it will hit the primary mirror. Other missions may be able to tolerate multiple bounces, and spacing would have to be selected accordingly.

It will be appreciated that AO-deflecting projections need not be annular ridges or even arranged in an annular or any other regular pattern. More specifically, the deflective structures may be an array of individual projections from the interior surface of the shell that may or may not be part of any annular or other pattern but project from various interior surface locations such that the desired overall deflection of AO is achieved. Such projections may have one or more deflective facets or surfaces configured and positioned to achieve that desired overall deflection.

Although the axial cross-sections of the ridges 32-38 are shown as isosceles triangles in the example illustrated in FIG. 3, that is not to be construed as a limiting feature of the principles disclosed herein. More particularly, the important parameters are the angles of the forward-facing surfaces of the ridges relative to the optical axis, and the distances between the ridges. The rearward-facing surfaces of the ridges impart minimal, if any, deflections to the AO atoms and therefore can have substantially any configuration that does not interfere with the intended function of the ridges.

Likewise, although the axial spacings between ridges 32-38 are shown as equal in FIG. 3, it is to be understood that this, too, is not a limiting feature of the principles disclosed herein. Specifically, those spacings (i.e., the gap regions) are typically determined by the attitude angles to be experienced in LEO for a particular mission, since that is the parameter that determines the flow direction of AO atoms entering the metering shell. Further, depending on the particular application for the system, the ridges in any array need not be identical in width or height.

It will be appreciated that, although the present disclosure focuses on mitigating AO damage to a primary mirror in a telescope, the principles disclosed herein apply to protecting a wide variety of other types of oxygen-reactive surfaces that are subject to degradation when exposed to bombardment by AO. Such a surface would be provided with a hood or shell configured to project forwardly therefrom, and an array of AO-deflecting projections, such as those described above, would be provided on the interior surface of the shell.

Although the array of axially spaced ridges can be formed on the interior wall of the metering shell in substantially any manner of manufacture, a preferred approach according to the principles described herein is to machine or otherwise forge an inverse of the array of spaced ridges on mandrel tooling used to form the metering shell. A suitable epoxy resin composite, or other material that is capable of meeting the requirements described herein, is then formed on the mandrel to imprint the integral array of spaced ridges therein before the metering shell forming process. During the metering shell forming process the mandrel is heated to or slightly above the curing temperature of the resin to set the integral metering shell configuration, including the interior surface of the shell with the array of projecting structures. The mandrel and cured resin are then cooled to permit the mandrel to shrink sufficiently more than the cured resin to permit the mandrel to be axially removed from the resin without damaging the projecting structures.

Figure 4:
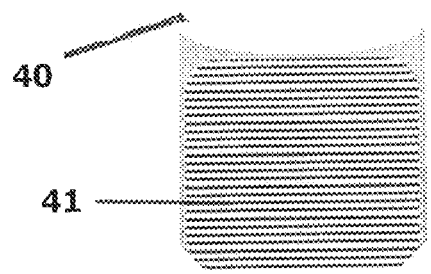
FIGS. 4, 5 and 6 are schematic illustrations of successive steps in a manufacturing process using the principles disclosed herein.
Figure 5:
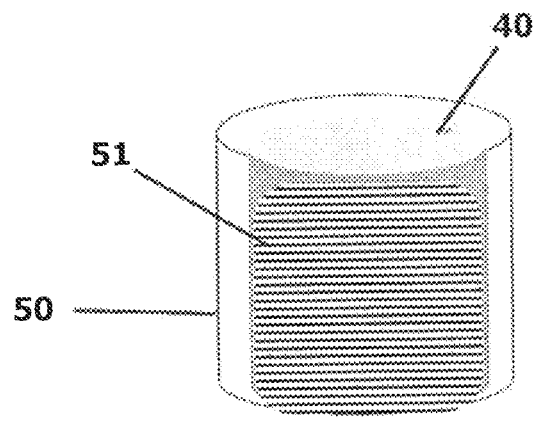
Figure 6:
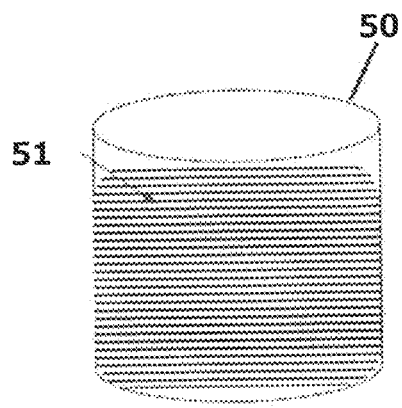

More specifically, FIG. 4 schematically depicts a portion of a mandrel 40 about which an array of spaced ridges is defined. FIG. 5 depicts the mandrel 40 with epoxy 51 applied thereto to adapt to the array of spaced ridges, the mandrel and epoxy being inserted in the metering shell 50 during the metering shell forming process. In FIG. 6 the mandrel has been removed after cooling leaving the metering shell 50 with the array 51 of spaced ridges imprinted on its interior surface.

Summarizing the present disclosure, an array of three-dimensional projections is imprinted onto or otherwise provided on the interior surface of a tubular shell to deflect or redirect AO atoms as they bounce off the forward-facing surfaces of the projections before those atoms reach a protected surface at a rearward end of the shell.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A system configured for deployment in low earth orbit and comprising an optical surface capable of being damaged when impacted by atomic oxygen, said system comprising:

a tubular shell having a generally cylindrical interior surface and an open forward end projecting forwardly from said optical surface, wherein the interior surface is disposed concentrically about an optical axis of said optical surface; and multiple projecting structures extending from said interior surface generally inward toward the optical axis from respective spaced locations along said interior surface for mitigating damage to the optical surface due to impacting atomic oxygen entering the open forward end of the shell;

wherein said projecting structures have respective forward-facing surfaces configured to deflect atomic oxygen entering the forward end of the shell.

2. The system of claim 1 wherein the projecting structures and the interior surface of the shell therebetween is made from a material having known atomic oxygen deflection properties.

3. The system of claim 1 wherein the projecting structures have predetermined radial projection lengths, and wherein the interior surface of the shell has a diameter several orders of magnitude greater than said radial projection lengths.

4. The system of claim 3 wherein all of the projecting structures and spaces therebetween are formed integrally in an array from said material.

5. The system of claim 3 wherein the projecting structures are multiple axially spaced annular ridges projecting inward toward the optical axis from said interior surface.

6. The system of claim 5 wherein at least some of said ridges are segmented into arcuate sections.

7. The system of claim 5 wherein said ridges have a generally triangular axial cross-section projecting and tapering radially inward from the interior surface of the metering shell.

8. The system of claim 5 wherein all of the annular ridges and spaces therebetween are formed integrally in an array from said material.

9. The system of claim 3 wherein said optical surface is a primary mirror of a telescope.

10. The system of claim 2, wherein the known atomic oxygen deflection properties are such that atomic oxygen entering the open forward end of the shell deflects one or more times at angles that ultimately direct the atoms away from the optical surface and back out through the forward end of the shell.

11. The system of claim 5, wherein each ridge has a forward facing surface disposed at an angle determined at least in part by the distance of that ridge from the forward end of the shell, and in part by an expected attitude angle between the optical axis and direction of travel of the shell in the low earth orbit.

12. The system of claim 11 wherein said angles are in the range from approximately 50° to 75°.

* * * * *